J. E. MOON.
SHOVEL.
APPLICATION FILED MAY 18, 1918.
1,274,927.
Patented Aug. 6, 1918.
2 SHEETS—SHEET 1.
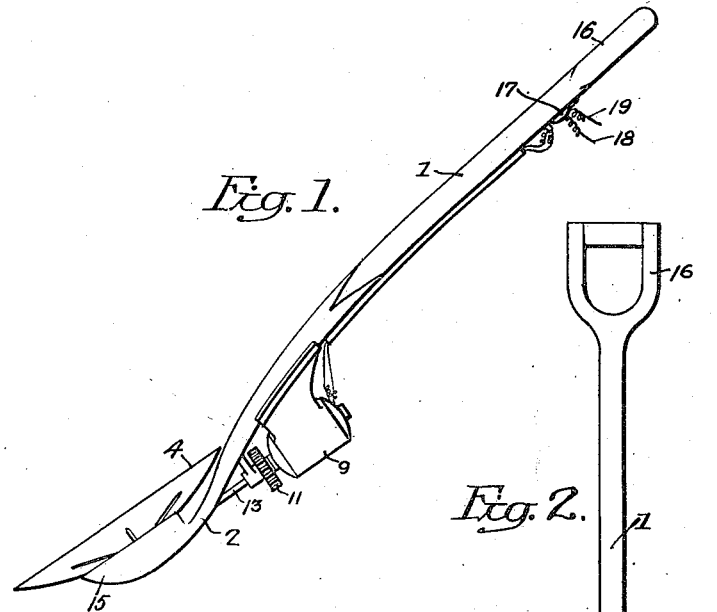
Fig. 1.
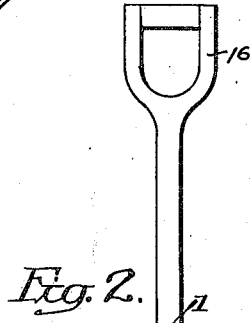
Fig. 2.
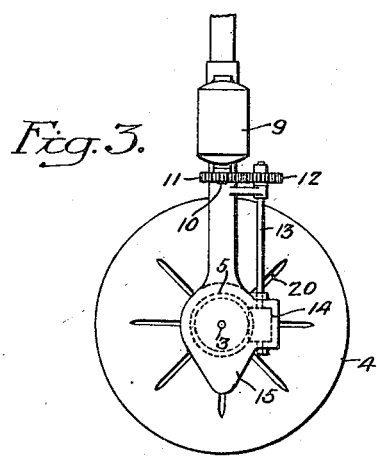
Fig. 3.
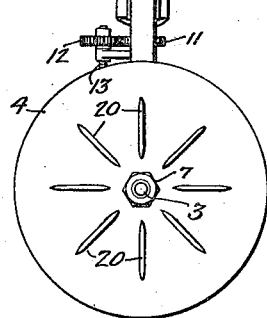
Fig. 7.
Fig. 6.
Fig. 5.
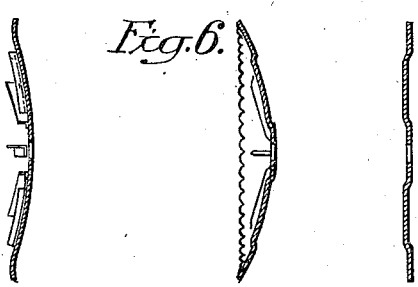
Inventor,
James E. Moon,
by his Attorneys,
Howson & Howson

J. E. MOON.
SHOVEL.
APPLICATION FILED MAY 18, 1918.

1,274,927.

Patented Aug. 6, 1918.
2 SHEETS—SHEET 2.

Inventor;
James E. Moon,
by his Attorneys,

UNITED STATES PATENT OFFICE.

JAMES EDWARD MOON, OF MORRISVILLE, PENNSYLVANIA.

SHOVEL.

1,274,927.

Specification of Letters Patent.

Patented Aug. 6, 1918.

Application filed May 18, 1918. Serial No. 235,299.

*To all whom it may concern:*

Be it known that I, JAMES EDWARD MOON, a citizen of the United States, and a resident of Morrisville, county of Bucks, State of Pennsylvania, have invented certain Improvements in Shovels, of which the following is a specification.

The object of my invention is to construct a hand shovel in which the blade is rotated by power so that when the shovel is inserted in the ground it will throw the dirt to one side without the necessity of lifting a load of dirt by the shovel.

The invention is particularly adapted for use in nurseries where the earth is a loam or a light soil and usually free from stones and heavy clays, but it may be used for other ground, if found desirable.

In the accompanying drawings:

Figure 1 is a side view of my improved hand shovel;

Fig. 2 is a front view;

Fig. 3 is a rear view;

Figs. 5, 6 and 7 are views of a modification of the blade; and

As before remarked, this invention is particularly adapted for removing dirt around small trees so that the manual labor necessary in lifting the dirt is dispensed with. Furthermore, by using a power driven shovel the dirt can be detached from the small and tender roots more readily and without injury to the roots, than if the ordinary shovel were used.

Figure 4:
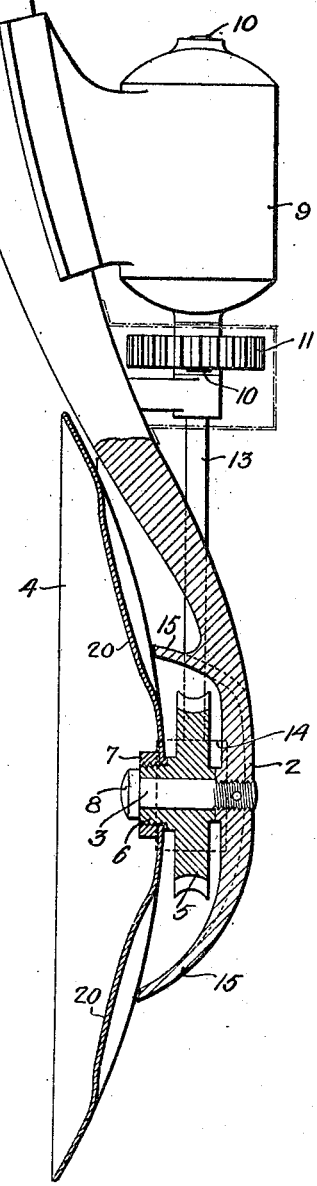
Fig. 4 is an enlarged sectional view.

Referring to the drawings, 1 is the handle of the shovel having a metallic portion 2 forming a bearing for a spindle 3 on which is mounted the blade 4, which, in the present instance is in the form of a dished disk, as shown in Figs. 1 and 4. The spindle 3, in the present instance, is screwed into a portion of the handle and can be held therein by a pin, or other means of fastening, so as to make a permanent connection. Loosely mounted on the spindle between the head 8 and the portion 2 is a worm wheel 5 having a threaded hub 6 which extends through a central opening in the blade 4. The blade is held in place by a nut 7 and can be removed when desired by detaching the nut.

While I have illustrated one construction, it will be understood that this construction may be modified without departing from the essential features of the invention.

Mounted, in the present instance, on the portion 2 of the handle is an electric motor 9. The armature shaft of this motor has a gear wheel 11 thereon, which meshes with the gear wheel 12 on a worm shaft 13 having a worm 14 thereon meshing with the worm wheel 5 on the spindle 3. The shaft 13 is adapted to suitable bearings on the portion 2 of the handle and the worm gearing is inclosed within the casing 15 forming an integral part of the portion 2. The gears 11 and 12 are also preferably inclosed as shown by dotted lines in Fig. 4. On the opposite end of the handle 1 is a hand hold 16, and on the upper portion of the handle is an electric switch 17 and terminals 18 and 19 which can be temporarily attached to a line wire for supplying an electric current to the motor. The wire leading from the switch 17 to the motor is preferably inclosed in suitable tubing, in the present instance. The rotating blade 4 has a series of radial ribs 20 formed thereon, as clearly shown in Fig. 4, and these ribs may be formed in any suitable manner, and of any size and number so as to engage the earth and throw it out of one side of the opening formed by the shovel.

In Figs. 1 to 4, I have shown the ribs formed by pressing the metal, while in Fig. 7 I have shown separate ribs secured to the blade by welding, or other means. It will be understood that the projections on the blade may be of any shape desired.

While I prefer to make the blade of the shovel dished, as shown in Fig. 4, it may be made flat in some instances, as shown in Fig. 5, with or without ribs, or it may have a serrated edge, as shown in Fig. 6. This construction can be used where it is desired to dig into comparatively stiff ground, such as clays, or to cut sod ground.

Figures 8, 9:
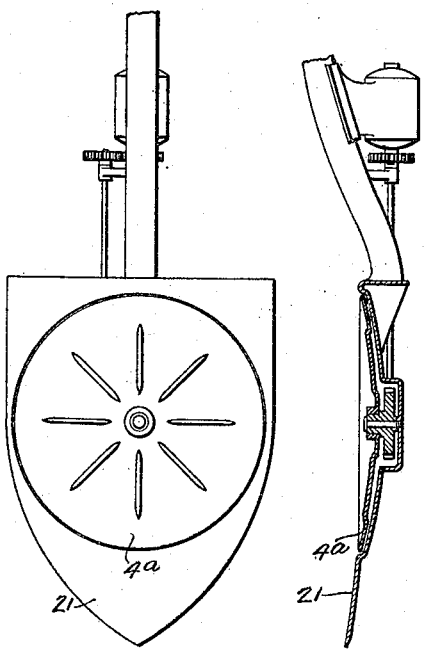
Figs. 8 and 9 are views showing a modification of the invention in which a rotating blade is used in connection with a fixed blade.

In Figs. 8 and 9, I have illustrated a modification of the invention in which the rotating blade 4ª is located in a depression in the fixed blade 21 of any ordinary shape. By this construction, the blade 21 can be used for digging in the customary manner, and when it is desired to use the rotating blade the switch may be shifted so as to cause the current to pass through the motor and rotate the blade.

I claim:

1. A hand shovel having a rotatable blade; and power means for rotating said blade.

2. The combination of a hand shovel; a handle; a pivoted blade mounted on the handle; a motor carried by the handle; and gearing between the motor and the pivoted blade, whereby the blade is rotated by the motor.

3. The combination of a handle having a bearing at its lower end; a gear wheel mounted on the bearing; a circular blade attached to the gear wheel; and means for turning said blade.

4. The combination of a handle having a bearing at its lower end; a gear wheel mounted on the bearing; a circular blade attached to the gear wheel; a motor on the handle; and a worm meshing with the gear wheel and driven by the motor.

5. The combination in a hand shovel, of a handle having a bearing at its lower end; a gear wheel mounted on the bearing; a dished disk detachably secured to the gear wheel; a motor; and gearing between the motor and the gear wheel for causing the disk to rotate.

6. The combination in a shovel, of a handle; a rotatable disk mounted on one end of the handle, said disk being dished; a motor on the handle for driving the disk; and a switch located near the hand end of the handle and connected to the motor and arranged to be connected to an electric circuit so that the rotation of the disk can be controlled by the switch.

7. The combination in a shovel, of a handle; a disk rotatably mounted on the lower portion of the handle having a series of projections thereon for engaging the earth; and means for rotating said disk.

8. The combination in a hand shovel, of a handle; a rotatable dished disk mounted on one end of the handle; and means for rotating said disk, said disk having a series of radiating ribs thereon.

In witness whereof I affix my signature.

JAMES EDWARD MOON.

Copies of this patent may be obtained for five cents each, by addressing the "Commissioner of Patents, Washington, D. C."